United States Patent
Yoon et al.

(10) Patent No.: US 9,489,012 B2
(45) Date of Patent: Nov. 8, 2016

(54) VIDEO WALL AND FIXING APPARATUS THEREFOR

(71) Applicant: LG ELECTRONICS INC., Seoul (KR)

(72) Inventors: Ilsub Yoon, Seoul (KR); Kyoyoon Koo, Seoul (KR); Hyunmin Jang, Seoul (KR); Jaewon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 13/953,636

(22) Filed: Jul. 29, 2013

(65) Prior Publication Data

US 2014/0313645 A1 Oct. 23, 2014

(30) Foreign Application Priority Data

Apr. 17, 2013 (KR) ........................ 10-2013-0042343

(51) Int. Cl.
*G06F 1/16* (2006.01)
*G09F 9/302* (2006.01)

(52) U.S. Cl.
CPC ........... *G06F 1/1601* (2013.01); *G09F 9/3026* (2013.01)

(58) Field of Classification Search
CPC ........ G09F 15/0068; G09F 7/00; G09F 7/18; G09F 7/08; G09F 7/02; G09F 15/0012; A47G 1/065

See application file for complete search history.

(56) References Cited

U.S. PATENT DOCUMENTS

| | | | | |
|---|---|---|---|---|
| 2,286,976 A | * | 6/1942 | Roberts | 52/506.07 |
| 3,084,401 A | * | 4/1963 | Findlay | 52/476 |
| 3,325,954 A | * | 6/1967 | Olson | 52/302.1 |
| 4,712,350 A | * | 12/1987 | Vukmanic | 52/506.07 |
| 4,720,944 A | * | 1/1988 | Loicq | 52/1 |
| 2004/0098939 A1 | * | 5/2004 | Hsu | 52/506.07 |

* cited by examiner

*Primary Examiner* — Cassandra Davis
(74) *Attorney, Agent, or Firm* — Birch, Stewart, Kolasch & Birch, LLP (57) ABSTRACT

Disclosed is a fixing apparatus for a video wall to fix a plurality of display panels disposed in a lattice pattern, including a plurality of top case units each positioned between neighboring ones of the display panels, each of the top case units comprising a middle frame inserted between the neighboring ones of the display panels to extend to rear surfaces of the display panels, and a bezel frame extending from the middle frame to opposite sides in a perpendicular direction to the middle frame to cover ends of front surfaces of neighboring display panels, and a fastening member fastened to the middle frame extending to the rear surfaces of the display panels to fix the display panels. In the fixing apparatus, neighboring display panels share one top case, and thus the gap between the display panels for a video wall may be reduced.

19 Claims, 8 Drawing Sheets

VIDEO WALL AND FIXING APPARATUS THEREFOR

Pursuant to 35 U.S.C. §119(a), this application claims the benefit of earlier filing date and right of priority to Korean Application No. 10-2013-0042343, filed on Apr. 17, 2013, the contents of which are hereby incorporated by reference herein in their entirety.

BACKGROUND OF THE INVENTION

1. Field of the Invention

The present invention relates to a fixing apparatus for a video wall including a top case positioned between display panels for installation of the video wall, for which a large screen is formed by connecting the display panels to each other.

2. Discussion of the Related Art

Recently, digital signage, which displays various content and messages through a display panel, has been used instead of hardware media such as signboards and posters for outdoor advertising. With rapid development of intelligent digital imaging devices based on liquid crystal displays (LCDs) and light emitting diodes (LEDs), demand for digital signage is increasing.

Particularly, a video wall formed by arranging a plurality of display panels in a lattice pattern is widely used in large spaces such as exhibition halls and event halls, which require a large screen, or for the purpose of outdoor advertising.

The video wall, which is also referred to as a multivision, may realize a large screen using small display panels. Accordingly, manufacturing costs of the display panels are reduced. In addition, when the video wall is temporarily installed or the position and arrangement thereof needs to be changed, it may be easily disassembled and reassembled.

However, as one screen needs to be configured using a plurality of display panels, minimizing gaps between the display panels in connecting the display panels is very important in realistically appearing to be one screen.

SUMMARY OF THE INVENTION

Accordingly, the present invention is directed to a fixing apparatus for a video wall and a method for operating the same that substantially obviate one or more problems due to limitations and disadvantages of the related art.

An object of the present invention is to reduce the size of a bezel of a top case unit positioned between a plurality of display panels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a fixing apparatus for a video wall to fix a plurality of display panels disposed in a lattice pattern includes a plurality of top case units each positioned between neighboring ones of the display panels, each of the top case units comprising a middle frame inserted between the neighboring ones of the display panels to extend to rear surfaces of the display panels, and a bezel frame extending from the middle frame to opposite sides in a perpendicular direction to the middle frame to cover ends of front surfaces of the neighboring ones of the display panels, and a fastening member fastened to the middle frame extending to the rear surfaces of the display panels to fix the display panels.

The bezel frame of each of the top case units extending from the middle frame to opposite sides may have a length asymmetrical with respect to the middle frame.

Opposite ends of the bezel frame may be formed in a V-shape.

Each of the top case units may further include a corner frame protruding from one end of the bezel frame formed in the V-shape in a perpendicular direction to the middle frame to cover a lateral surface of a corner of a corresponding one of the display panels.

The bezel frame may be rectangular, wherein the top case units comprise first top case units and second top case units, the first top case units disposed in a first direction form a plurality of rows, the first top case units of each rows may dispose to contact each other at ends thereof, and the second top case units disposed in a second direction perpendicular to the first direction may be disposed between the rows formed by the first top case units.

The bezel frame of each of the first top case units disposed in a first direction may be asymmetric with respect to the middle frame, and the bezel frame of each of the second top case units disposed in a second perpendicular direction to the first direction may be symmetrical with respect to the middle frame.

Each of the top case units may further include a shock absorbing pad formed on a surface of the middle frame facing a wider portion of the bezel frame.

A length of each of the top case units corresponds to a length of each of the display panels.

The fixing apparatus may further include a plurality of edge units formed in a reversed L-shape to cover lateral surfaces and front ends of the display panels located outside of the video wall, wherein the edge units comprise first edge units positioned at the display panels located at one side of the video wall and a second edge units positioned at the display panels located at the other side of the video wall, and wherein a width of the first edge units and a width of the second edge units are different.

The middle frame may further include a fastening hole spaced from the bezel frame corresponding to a thickness of the display panel, wherein the fastening member is inserted into the fastening hole.

The middle frame may further include a screw fastened to the rear surface of a corresponding one of the display panels through the fastening member In another aspect of the present invention, there is provided a video wall including a plurality of display panels disposed in a lattice pattern, a plurality of top case units each positioned between neighboring ones of the display panels, each of the top case units including a middle frame inserted between neighboring ones of the display panels to extend to rear surfaces of the display panels, and a bezel frame extending from the middle frame to opposite sides in a perpendicular direction to the middle frame to cover ends of front surfaces of the neighboring display panels, and a fastening member fastened to the middle frame extending to the rear surfaces of the display panels to fix the display panels.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" as applied to constituents are added or used interchangeably to facilitate description of the present invention, and do not suggest any unique meanings or functions.

Figure 1:
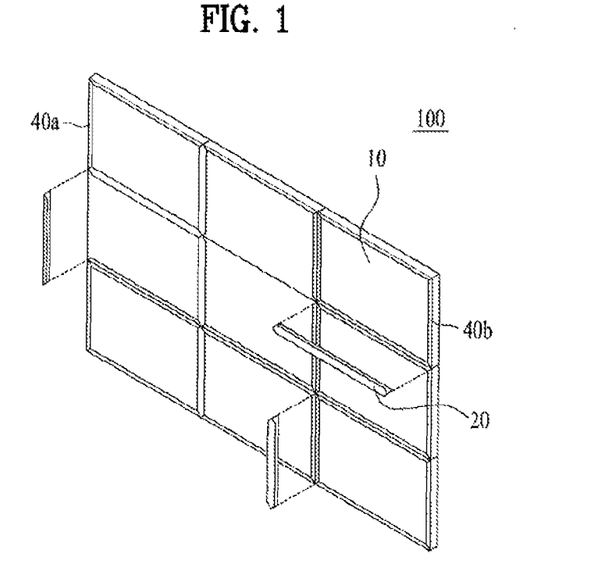
FIG. 1 is a view showing a video wall installed using a fixing apparatus for the video wall according to the present invention.
Figure 2:
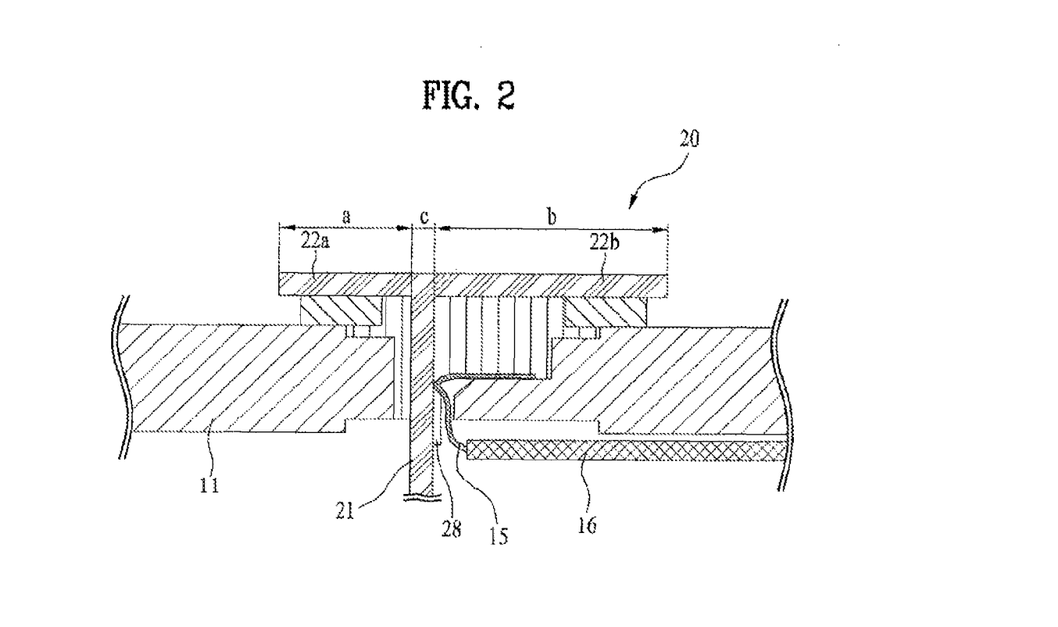
FIG. 2 is a cross-sectional view showing disposition of a top case unit and display panels of the fixing apparatus for the video wall according to the present invention.

FIG. 1 is a view showing a video wall 100 installed using a fixing apparatus for the video wall 100 according to the present invention 100, and FIG. 2 is a cross-sectional view showing disposition of a top case unit 20 and display panels 10 of the fixing apparatus for the video wall 100 according to the present invention. The video wall 100 includes a plurality of display panels 10 disposed in a lattice pattern, and a fixing apparatus to fix the display panels 10.

Each of the display panels 10 is divided into an active area where an image is displayed, and an inactive area positioned around the active area where an image is not displayed. A signal electrode to receive a signal from a drive unit 16 and deliver the signal to each transparent electrode in the active area is positioned in the inactive area. Recently, the width of the signal electrode has been greatly narrowed.

Figure 9A:
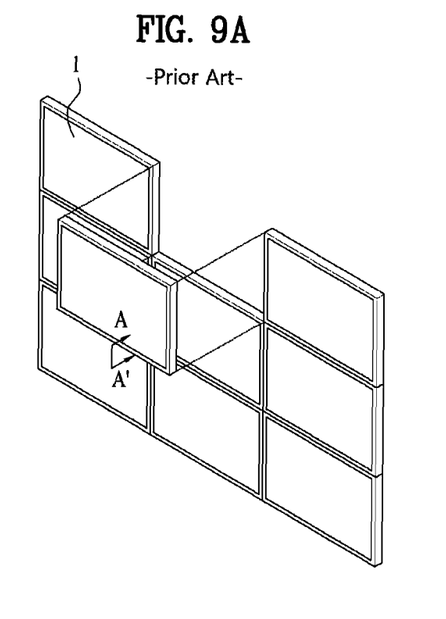
FIG. 9A is a perspective view showing a conventional fixing apparatus for a video wall.
Figure 9B:
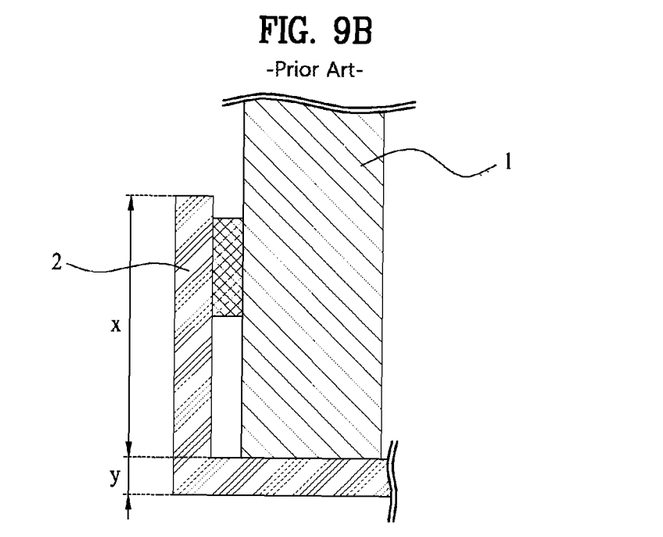
FIG. 9B is a cross-sectional view showing a conventional display panel.

FIGS. 9A and 9B show a conventional video wall and conventional display panels 1. Each of the display panels 1, which are used in conventional video walls, is provided with a top case 2 to cover the border of the front surface and the lateral surface of each of the display panels 1. The top case 2 serves as an outer case of the display panel 1, covering the inactive area at the border such that the inactive area is not exposed forward of the front surface.

In conventional cases, the video wall is configured by disposing, in a lattice pattern, the display panels 1 surrounded by the top case 2 and fixing the same, as shown in FIG. 9. According to the structure of the conventional video wall, no matter how closely the display panels 1 are disposed, the gap between neighboring active areas is twice the size corresponding to the front width x and the side thickness y of the top case 2.

In the present invention, neighboring display panels 10 are arranged to share one top case to reduce the gap therebetween.

The top case according to the present invention is configured with T-shaped top case units 20. Each of the T-shaped top case units 20 is configured with a middle frame 21 inserted between neighboring display panels 10, and a bezel frame 22 perpendicularly extending from the middle frame 21 to the opposite sides to respectively cover ends of the front surfaces of the neighboring display panels 10.

As one middle frame 21 of the top case unit 20 replaces the conventional structure, in which each display panel 1 is provided with the top case 2 and thereby two lateral surfaces of the top cases 2 overlap each other, the gap between the neighboring display panels 10 is formed only by the thickness c of one middle frame 21. Accordingly, the gap (a+b+c) between the active areas of the neighboring display panels 10 is narrowed by the side thickness y of the top case. As the gap between the active areas of the neighboring video walls 100 has recently been reduced to a few millimeters, reducing the size by the thickness y of the side portion of the top case may solely reduce the gap between neighboring active areas by more than 5%.

Since the display panels 10 having the same size are disposed in a lattice pattern, the video wall 100 may be realized by assembling a plurality of top case units 20 having lengths corresponding to respective sides of the display panel 10. As the fixing apparatus for a video wall is modular, design of the top case is simplified compared to that of the conventional top case.

The display panel 10 is configured with a panel portion 11 having transparent electrodes formed in a lattice pattern and a drive unit 16 to selectively send an image signal to the panel portion 11 having the transparent electrodes. A flexible circuit board 15 is connected to one or two ends of the panel portion 11 for connection between the drive unit 16 and the panel portion 11.

As exemplarily shown in FIG. 2, one end of the panel portion 11 (the end of the right panel in FIG. 2) connected to the drive unit 16 extends more than the other end of the panel portion 11 (the end of the left display panel in FIG. 2) that is not connected to the drive unit 16 to allow the flexible circuit board 15 to be attached. That is, the inactive area is asymmetrically arranged with respect to the active area, and therefore the width of the one side of the inactive area is different from that of the other side of the inactive area for the neighboring display panels 10.

As exemplarily shown in FIG. 2, for the top case unit 20, the width a of a bezel frame 22a extending from the middle frame 21 to one side is different from the width b of a bezel frame 22b extending to the opposite side. With regard to the bezel frame 22, the middle frame 21 is positioned closer to one end of the bezel frame 22.

Here, the middle frame 21 is further provided with a shock absorbing pad 28 formed on a surface thereof facing toward the bezel frame 22b having a larger width, to prevent disconnection of wires on the flexible circuit board 15.

Figure 3A:
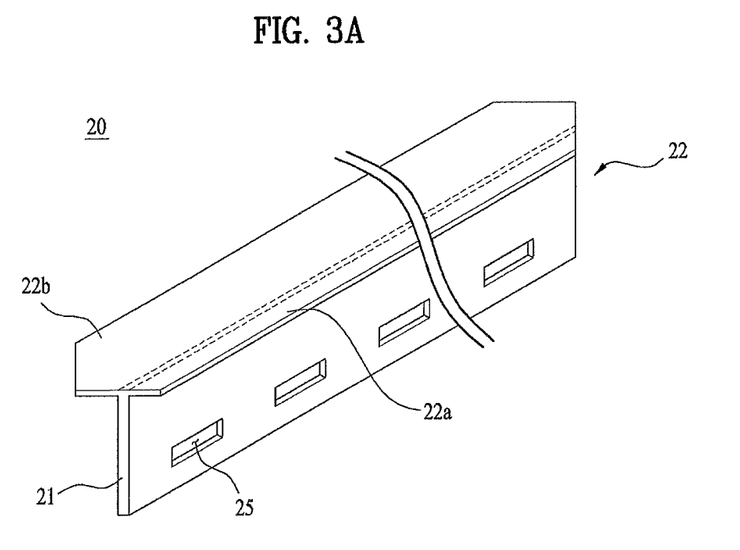
FIG. 3A is a perspective view showing a top case unit according to a first exemplary embodiment of the fixing apparatus for a video wall of the present invention.
Figure 3B:
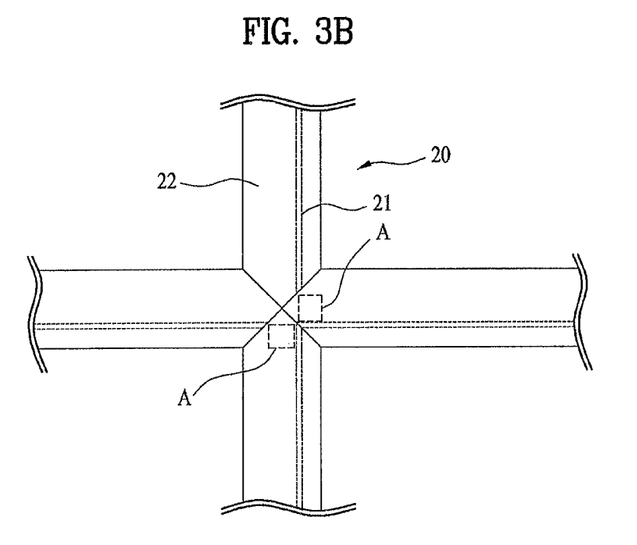
FIG. 3B is a front view showing the first exemplary embodiment of the fixing apparatus for a video wall of the present invention.

FIGS. 3A and 3B are a perspective view and a plan view showing a first exemplary embodiment of the top case unit 20 of the present invention. In the illustrated embodiment, the end of the bezel frame 22 of the top case unit 20 is processed to have a V-shape. Since the middle frame 21 is positioned closer to one end of the bezel frame 22, the middle frame 21 is not arranged at the angular point of the V-shaped end of the bezel frame 22, but positioned away from the angular point, as exemplarily shown in FIG. 3A.

Once the top case unit 20 of the illustrated embodiment is assembled, the edges of the ends of the four display panels 10 are joined together in an X-shape, as exemplarily shown in FIG. 3B. Since the middle frame 21 is positioned closer to one end of the bezel frame 22, a portion A where the middle frame 21 is not positioned is present on the lateral surface of the corner of the display panel 10.

Figure 4A:
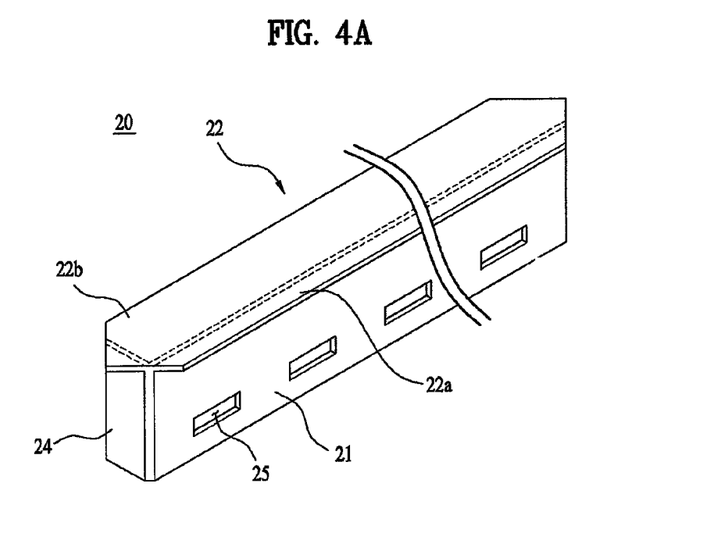
FIG. 4A is a perspective view showing a top case unit according to a second embodiment of the fixing apparatus for a video wall of the present invention.

In the case that neighboring middle frames 21 of the top case unit 20 are spaced from each other at the corners of the display panels 10, slight error may occur in installation of the video wall 100. Therefore, a corner frame 24 may be further formed at the portion A where the middle frame 21 is not positioned, as shown in FIG. 4A. The corner frame 24 protrudes rearward from one end of the V-shaped portion of the bezel frame 22 and is connected to one end of the middle frame 21 at a right angle.

Figure 4B:
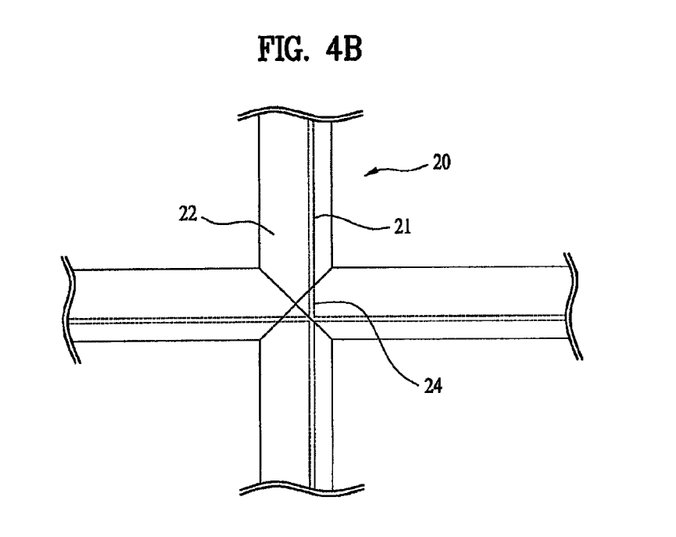
FIG. 4B is a front view showing the second embodiment of the fixing apparatus for a video wall of the present invention.

The corner frame 24 needs to be formed only at one end of the top case unit 20 to allow assembly of the top case unit 20 as shown in FIG. 4B. In the case that the corner frame 24 is formed at both sides of the top case unit 20, installation of the display panels 10 is not possible since the gap between the corner frames 24 is smaller than the gap between the display panels 10.

In the case that the drive unit 16 of the display panel 10 is positioned at two ends of the display panel 10 (for example, the upper side and the right side), the entire video wall 100 may be assembled using only the top case unit 2 having an unbalanced shape as shown in FIGS. 3A and 4A. In the case that the drive unit 16 is coupled to only one end, however, inactive areas may be asymmetrically arranged with respect to the first direction, while inactive areas may be symmetrically arranged with respect to the second direction.

Figure 5A:
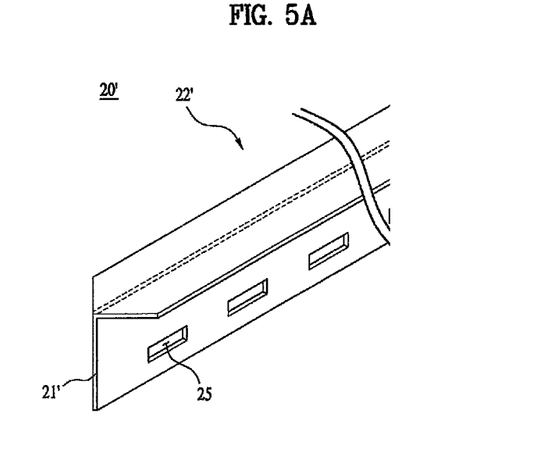
FIG. 5A is a perspective view showing a top case unit according to a third embodiment of the fixing apparatus for a video wall of the present invention.

For the symmetric direction of the inactive areas of the display panels 10, a top case unit 20' having a middle frame positioned at the center of a bezel frame 22' may be used as exemplarily shown in FIG. 5A.

Figure 5B:
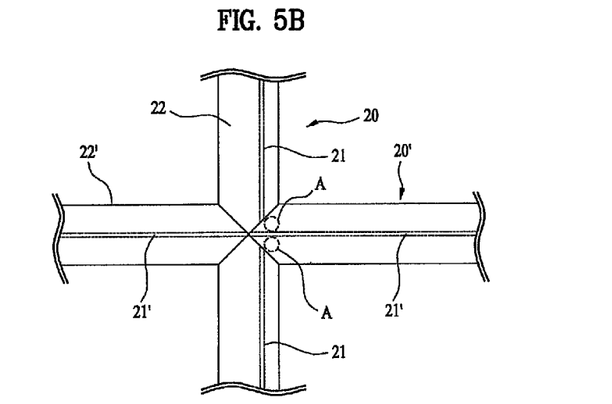
FIG. 5B is a front view showing the third embodiment of the fixing apparatus for a video wall of the present invention.

In this case, the top case unit 20 disposed in the first direction (the vertical direction in FIG. 5B) is asymmetric with respect to the middle frame 21, while the top case unit 20' disposed in the second direction (the horizontal direction in FIG. 5B) is symmetrical with respect to the middle frame 21', as exemplarily shown in FIG. 5B. The top case unit 20 shown in FIG. 3A may be used for the top case unit 20 disposed in the first direction, and the top case unit 20' shown in FIG. 5A may be used for the top case unit 20' disposed in the second direction.

In the illustrated embodiment, the corner A of the display panel 10 has a lateral portion that is partially uncovered by the middle frame 21, 21'. As exemplarily shown in FIG. 6A, a corner frame 24' protruding from the V-shaped end of the bezel frame 22' in the rearward direction of the bezel frame 22' and perpendicularly crossing the middle frame 21 may be further provided.

Figure 6A:
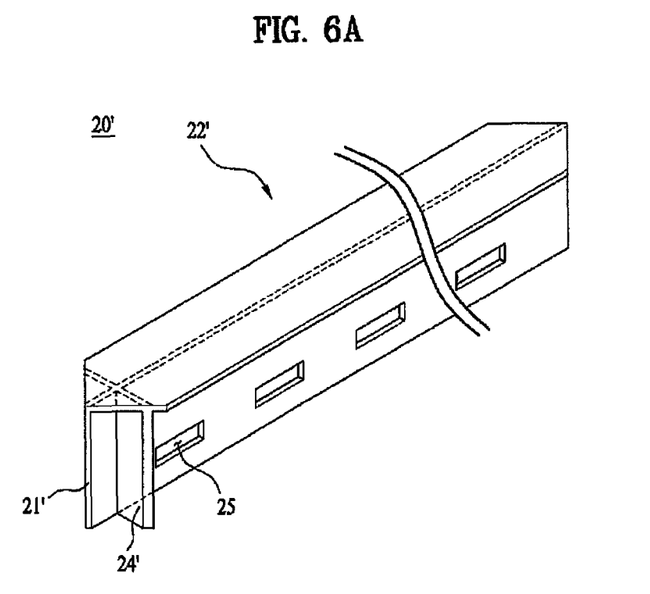
FIG. 6A is a perspective view showing a top case unit according to a fourth embodiment of the fixing apparatus for a video wall of the present invention.

In contrast with the embodiment of FIG. 4A, in which one end of the corner frame 24 is perpendicularly connected to one end of the middle frame 21, the corner frame 24' of FIG. 6A may be formed to cross the middle frame 21' at a right angle.

Figure 6B:
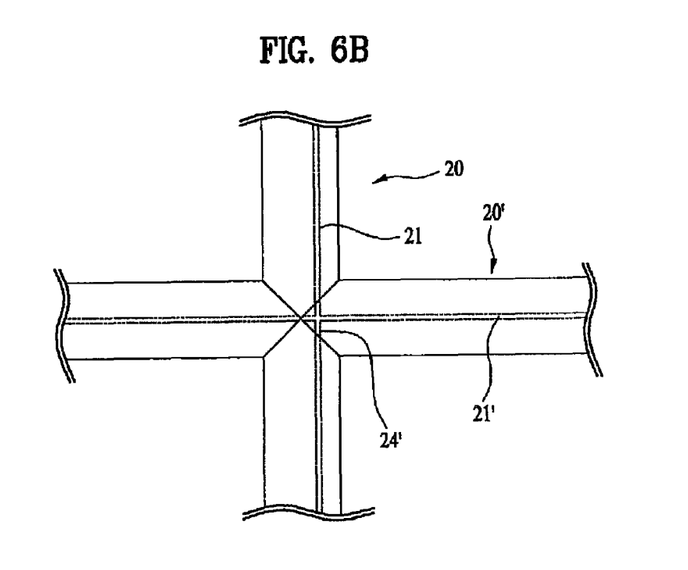
FIG. 6B is a front view showing the fourth embodiment of the fixing apparatus for a video wall of the present invention.

In the case of the fixing structure for the video wall 100 using the top case unit 20 of FIG. 3A and the top case unit 20' of FIG. 6A, the corners of the display panels 10 are also covered as exemplarily shown in FIG. 6B, and therefore an error occurring in installation of the video wall 100 may be reduced.

Figure 7A:
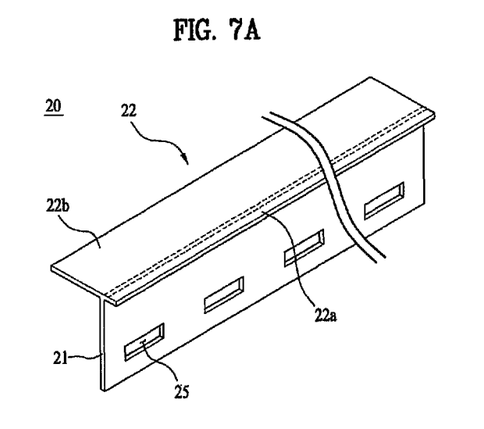
FIG. 7A is a perspective view showing a top case unit according to a fifth embodiment of the fixing apparatus for a video wall of the present invention.

For the top case unit 20, the end of the bezel frame 22 may alternatively be formed in a rectangular shape as shown in FIG. 7A, rather than in a V-shape. Depending on the shape of the end of the top case unit 20, arrangement of the top case units 20 may vary during installation of the video wall 100.

Figure 7B:
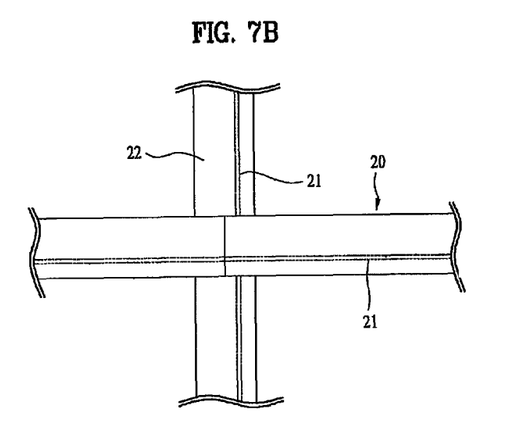
FIG. 7B is a front view showing the fifth embodiment of the fixing apparatus for a video wall of the present invention.

In the case that the video wall 100 is installed using the top case units 20 of FIG. 7A, a first top case units 20 disposed in the first direction (the horizontal direction in FIG. 7B) form a plurality of rows, the first top case units 20 are sequentially arranged with neighboring ends thereof in contact with each other, and a second top case units 20 disposed in the second direction (the vertical direction in FIG. 7B) perpendicular to the first direction are arranged between the rows formed by the first top case units 20 disposed in the first direction, as exemplarily shown in FIG. 7B.

The top case unit 20 is fastened to the display panels 10 through a fastening member joined to the middle frame 21 extending to the rear surface of the display panel 10. As exemplarily shown in FIGS. 3A, 4A and 5A, the middle frame 21 of the top case unit 20 is provided with fastening holes 25 spaced a predetermined distance from the bezel frame 22. The predetermined distance corresponds to the thickness of the display panel 10.

Figure 8A:
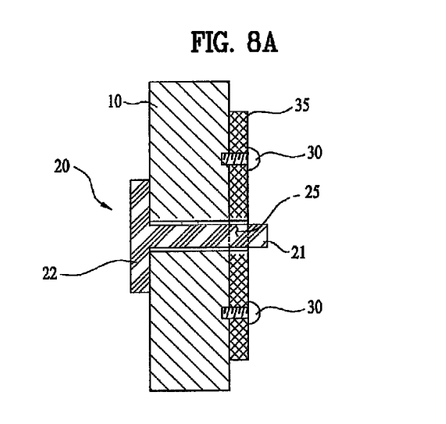
FIG. 8A is a side view illustrating an exemplary embodiment of the fixing apparatus for a video wall of the present invention.
Figure 8B:
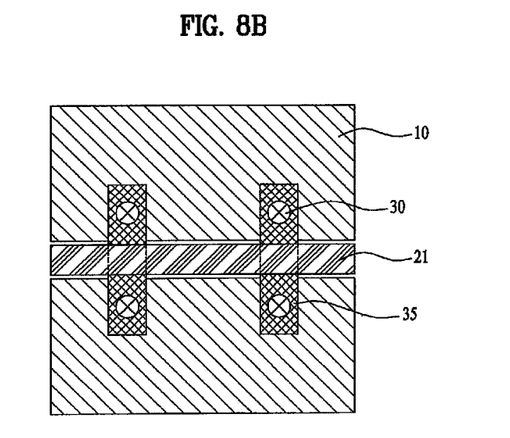
FIG. 8B is a rear view illustrating the exemplary embodiment of the fixing apparatus for a video wall of the present invention.

FIGS. 8A and 8B are a cross-sectional view and a rear view showing a fastening member 35 inserted into the fastening hole 25 of the middle frame 21. When the top case unit 20 is inserted between the display panels 10 from the front of the display panels 10, the fastening hole 25 formed in the middle frame 21 protrudes rearward, and the fastening member 35 is inserted into the fastening hole 25, as shown in FIG. 8A.

The fastening member 35 serves to fix the top case units 20 to the display panels 10 and position the display panels 10, with the rear surfaces of the display panels 10 level with each other. To stably fix the display panels 10 to the top case units 20, screws 30 may be fastened to the rear surfaces of the display panels 10 through the fastening member 35, as exemplarily shown in 8B.

In FIG. 1, edge units 40a and 40b to cover the borders of the display panels 10 positioned at the outer periphery of the display panels 10 may be further provided in addition to the top case units 20 positioned between the display panels 10. Each of the edge units 40a and 40b are joined to the lateral surface and the front end of one display panel 10 located at the outer side of the video wall, thereby having a reversed L-shaped cross section.

The edge units 40a and 40b also cover the inactive area on the border of the front surface of the display panel 10. In the case that the display panel 10 having the asymmetric inactive areas on both sides is used as described above, the portions of the edge unit 40a positioned at one side and the edge unit 40b positioned at the other side which cover the ends of the front surfaces of the display panels 10 have different widths.

The widths of the front portions of the edge units 40a and 40b respectively correspond to the width of the bezel frame 22a at one side of the top case unit 20 and the width of the bezel frame 22b at the other side of the top case unit 20.

In the case of the fixing apparatus for a video wall according to the present invention, neighboring display panels share one top case, and thereby the gap between the display panels for the video wall may be reduced.

In addition, as neighboring display panels can be positioned at the front with the heights thereof level with each other, a more integrated screen may be realized.

As apparent from the above description, the fixing apparatus for a video wall according to the present invention allows neighboring display panels to share one top case, and thereby the gap between the display panels for the video wall may be reduced.

In addition, as neighboring display panels can be positioned at the front with the heights thereof level with each other, a more integrated screen may be realized.

The effects that can be obtained from the present invention are not limited to those stated above. Other effects unstated above will be clearly understood by those skilled in the art based on the above description.

It will be apparent to those skilled in the art that various modifications and variations can be made in the present invention without departing from the spirit or scope of the inventions. Thus, the present invention covers the modifications and variations of this invention provided they come within the scope of the appended claims and their equivalents.

What is claimed is:

1. A fixing apparatus for a video wall to fix a plurality of display panels disposed in a lattice pattern, the fixing apparatus comprising:
    a plurality of top case units including a first set of top case units oriented in a first direction and a second set of top case units oriented in a second direction perpendicular to the first direction, each top case unit being configured to be positioned between neighboring ones of the display panels, each of the top case units including:
        a middle frame configured to be inserted between the neighboring ones of the display panels and sized to extend to rear surfaces of the display panels;
        a bezel frame extending from the middle frame to opposite sides thereof in a perpendicular direction with respect to the middle frame and configured to cover ends of front surfaces of the neighboring ones of the display panels; and
        a fastening member associated with each of the middle frames of the plurality of top case units, the fastening members being configured to fix the display panels,
    wherein at least one longitudinal end of the bezel frame is formed in a V-shape, and
    wherein the at least one longitudinal end of the bezel frame faces at least one V-shaped longitudinal end of another bezel frame.

2. The fixing apparatus for a video wall according to claim 1, wherein the middle frame divides the bezel frame into a first portion on one side of the middle frame and a second portion on the opposite side of the middle frame, the first portion of the bezel frame being wider than the second portion of the bezel frame in a width direction.

3. The fixing apparatus for a video wall according to claim 1, wherein at least some of the top case units include a corner frame protruding from one end of the bezel frame in a perpendicular direction with respect to the middle frame, each of the corner frames being configured to cover a lateral surface of a corner of a corresponding one of the display panels.

4. The fixing apparatus for a video wall according to claim 1, wherein the bezel frame is rectangular,
    wherein the first set of top case units is disposed in the first direction to form a plurality of rows, the top case units of each row being disposed to contact each other at ends thereof, and
    wherein the second set of top case units is disposed between the rows formed by the first set of top case units.

5. The fixing apparatus for a video wall according to claim 1, wherein:
    the bezel frame of each of first top case units of the plurality of top case units is asymmetrical with respect to the middle frame; and
    the bezel frame of each of second top case units of the plurality of top case units is symmetrical with respect to the middle frame.

6. The fixing apparatus for a video wall according to claim 1, wherein each of the top case units includes a shock absorbing pad formed on a surface of the middle frame facing a wider portion of the bezel frame.

7. The fixing apparatus for a video wall according to claim 1, wherein a length of each of the top case units is selected to correspond to a length of each of the display panels.

8. The fixing apparatus for a video wall according to claim 1, further comprising a plurality of edge units configured to cover lateral surfaces and front ends of the display panels located at a periphery of the video wall.

9. The fixing apparatus for a video wall according to claim 8, wherein the edge units include first edge units configured to be positioned at the display panels located at one side of the video wall and second edge units configured to be positioned at the display panels located at the other side of the video wall, and
    wherein a width of each of the first edge units is different from a width of each of the second edge units.

10. The fixing apparatus for a video wall according to claim 1, wherein the middle frame includes a fastening hole spaced from the bezel frame a distance corresponding to a thickness of the display panels, and
    wherein the fastening member is inserted into the fastening hole.

11. A video wall comprising:
    a plurality of display panels disposed in a lattice pattern;
    a plurality of top case units, each top case unit being positioned between neighboring ones of the display panels, each of the top case units including:

a middle frame inserted between the neighboring ones of the display panels and sized to extend to rear surfaces of the display panels; and a bezel frame extending from the middle frame to opposite sides thereof in a perpendicular direction with respect to the middle frame and arranged to cover ends of front surfaces of the neighboring ones of the display panels; and a fastening member associated with each of the middle frames of the plurality of top case units to fix the display panels, wherein a total length of the bezel frame is greater than a total length of the middle frame.

12. The video wall according to claim 11, wherein opposite ends of the bezel frame are formed in a V-shape.

13. The video wall according to claim 11, wherein the bezel frame is rectangular, and wherein the top case units include:
first top case units disposed in a first direction to form a plurality of rows, the first top case units of each row being disposed to contact each other at ends thereof; and second top case units disposed in a second direction perpendicular to the first direction, the second top case units being disposed between the rows formed by the first top case units.

14. The video wall according to claim 11, wherein:
the bezel frame of each of first top case units of the plurality of top case units is asymmetrical with respect to the middle frame; and the bezel frame of each of second top case units of the plurality of top case units is symmetrical with respect to the middle frame.

15. The video wall according to claim 11, wherein the middle frame divides the bezel frame such that a portion of the bezel frame is wider than another portion of the bezel frame, and wherein each of the top case units includes a shock absorbing pad formed on a surface of the middle frame facing the wider portion of the bezel frame.

16. The video wall according to claim 11, further comprising a plurality of edge units configured to cover lateral surfaces and front ends of the display panels located at a periphery of the video wall.

17. The video wall according to claim 11, wherein the middle frame includes a fastening hole spaced from the bezel frame a distance corresponding to a thickness of the display panels, and wherein the fastening member is inserted into the fastening hole.

18. The fixing apparatus for a video wall according to claim 17, further comprising a screw fastened to a rear surface of a corresponding one of the display panels through the fastening member.

19. A fixing apparatus for a video wall to fix a plurality of display panels disposed in a lattice pattern, the fixing apparatus comprising:

a plurality of top case units, each top case unit being configured to be positioned between neighboring ones of the display panels, each of the top case units including:

a middle frame configured to be inserted between the neighboring ones of the display panels and sized to extend to rear surfaces of the display panels;

a bezel frame extending from the middle frame to opposite sides thereof in a perpendicular direction with respect to the middle frame and configured to cover ends of front surfaces of the neighboring ones of the display panels; and a fastening member associated with each of the middle frames of the plurality of top case units, the fastening members being configured to fix the display panels, wherein the middle frame divides the bezel frame into a first portion on one side of the middle frame and a second portion on the opposite side of the middle frame, the first portion of the bezel frame being wider than the second portion of the bezel frame in a width direction.

* * * * *